W. J. THOROLD.
PNEUMATIC TIRE AND THE LIKE.
APPLICATION FILED JUNE 8, 1908.
949,947.
Patented Feb. 22, 1910.
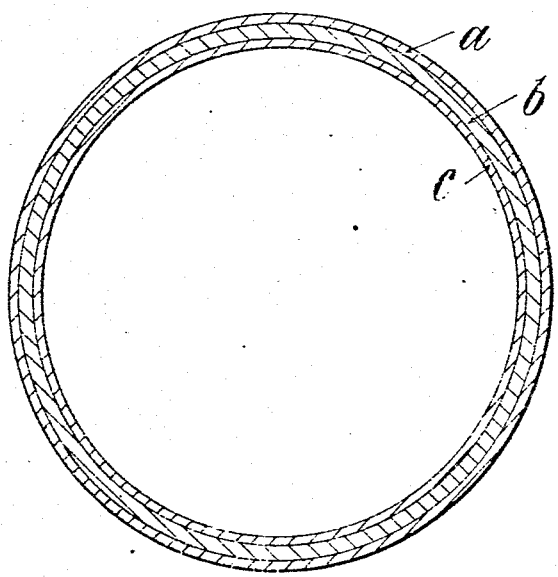
WITNESSES:
E. W. Symes
Edward L. George
INVENTOR.
W. J. Thorold.
Per Robert E. Phillips
Attorney.

UNITED STATES PATENT OFFICE.

WILLIAM JAMES THOROLD, OF LONDON, ENGLAND.

PNEUMATIC TIRE AND THE LIKE.

949,947.

Specification of Letters Patent. Patented Feb. 22, 1910.

Application filed June 8, 1908. Serial No. 437,410.

*To all whom it may concern:*

Be it known that I, WILLIAM JAMES THOROLD, a subject of the King of Great Britain and Ireland, residing at 90–93 Fleet street, in the city of London, England, have invented a new and useful Improvement in and Relating to Pneumatic Tires and the Like, of which the following is a specification.

The present invention relates to pneumatic tires and the like and comprises an improved method of and means for rendering the air tubes of pneumatic tires or the covers thereof in such cases when the air tubes are dispensed with, capable of automatically sealing up any puncture or incision caused therein and so preventing the escape of the contained compressed air.

Since the commercial introduction of pneumatic tires for road vehicles many devices, methods, and arrangements have been invented having for their object the prevention of the escape of the air from such tires in the event of the air tubes thereof becoming punctured or damaged. It has been proposed for instance to inject into the air tubes of pneumatic tires viscous substances such as molasses or glycerin, or gelatin, glue sugar, starch and dextrin compounds; or solutions, either aqueous or alcoholic, of gums or resins but none of such substances or compounds has been satisfactory in use and that for a variety of reasons some of which are sufficiently obvious as not to need further discussion. More feasible propositions have also been put forward involving the use of an inner viscous lining for the air tube formed from raw or partially vulcanized india-rubber or rubber compound. Many such propositions have been commercially tried and have met with a certain measure of success, but owing to the hitherto insuperable difficulty experienced in retaining such inner linings in their original effective condition, such "self-healing" tubes have fallen into desuetude.

Now, according to the present invention, which belongs to that class of self-healing tubes lastly described, use is made of a particular solvent for the raw rubber employed. The solution or compound so produced and when used in the manner hereinafter described allows of the production of an inner air tube for pneumatic tires which is perfectly efficacious in automatically sealing up any ordinary incision or puncture and effectually overcomes the disadvantages hitherto experienced with an air tube of this type.

In the accompanying drawing which illustrates this invention, the figure is a view in transverse section of an air tube embodying the present invention.

The preferred construction of an air tube for a pneumatic tire according to the present invention comprises an outer tube $a$ of vulcanized india-rubber as usual, an inner tube or lining $b$ of partially vulcanized rubber or rubber compound, and a further inner lining $c$ composed of pure rubber held in suspension within the solvent employed. This last inner lining $c$ which is the essence of this present invention is put into the tube in the form of a solution.

The solvent which is employed is a crude gas tar benzene having a high boiling point. The particular benzene employed must also have the following characteristics:—(a) specific gravity at 15° C., .880; (b) refractive index at 20° C., 1.5060; (c) distilling between 125° C. and 180° C., and (d) flash point (open test) 105° F. The usual coal tar solvent naphtha having a boiling point of about 100° C. to 140° C. is useless for the present invention and according to my experience success depends upon the employment of a benzene solvent which boils from 125° C. to 180° C. for which purpose the proportion of hydrocarbons of boiling point below 120° C. must be relatively small.

It has been ascertained by long-continued experiment that a suitable solution for the present invention comprises pure para rubber 4.3% and solvent 95.7%.

The preferred method of introducing the solution to form the innermost lining of the tube is as follows:—The lined tube is made in the way above-described and completed with the exception of the insertion of the usual valve. Through the hole into which the valve is subsequently fitted is poured a quantity of the above-described solution. The quantity of solution employed will obviously depend on the size of the tube and the thickness of the lining desired, but the preferred amount is such that the finished lining is from 1/8 to 3/16 of an inch in thickness over the entire interior surface.

After the solution is poured in, the tube is rapidly revolved alternately in different directions until the solution is equally distributed over the entire interior surface. The revolving should be repeated at intervals of eight hours during the ensuing 48 hours to prevent the solution settling in any particular part of the tube as it is essential that the finished lining should be of an equal thickness over the entire interior surface. At the expiration of the 48 hours a portion of the solution will have become dissipated by evaporation and the tube is then ready for the fitting of the valve and then for use.

I declare that what I claim is:—

An air tube for pneumatic tires comprising an outer layer of vulcanized india-rubber, an intermediate layer of partially vulcanized rubber compound in combination with an inner lining composed of pure rubber held in suspension in a crude gas tar benzene, as set forth.

WILLIAM JAMES THOROLD.

Witnesses:
 EDWARD S. GEORGE,
 R. WESTACOTT.